United States Patent
Killoran, Jr. et al.

(10) Patent No.: US 9,152,980 B2
(45) Date of Patent: *Oct. 6, 2015

(54) EMAIL-BASED E-COMMERCE

(71) Applicant: @PAY IP HOLDINGS LLC, Wilmington, DE (US)

(72) Inventors: John P. Killoran, Jr., Albuquerque, NM (US); Dennis William Peek, Albuquerque, NM (US); Matthew Custer, Albuquerque, NM (US)

(73) Assignee: @Pay IP Holdings LLC, Wilminton, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 14/324,807

(22) Filed: Jul. 7, 2014

(65) Prior Publication Data

US 2014/0324588 A1  Oct. 30, 2014

Related U.S. Application Data

(63) Continuation of application No. 13/074,222, filed on Mar. 29, 2011, now Pat. No. 8,775,263.

(51) Int. Cl.
*G06Q 30/02* (2012.01)
*G06Q 30/06* (2012.01)
*G06Q 10/10* (2012.01)
(Continued)

(52) U.S. Cl.
CPC .......... *G06Q 30/0258* (2013.01); *G06Q 10/107* (2013.01); *G06Q 20/12* (2013.01); *G06Q 30/0241* (2013.01); *G06Q 30/06* (2013.01); *G06Q 30/0601* (2013.01); *G06Q 30/0635* (2013.01); *H04L 51/02* (2013.01); *G06Q 30/02* (2013.01)

(58) Field of Classification Search
CPC . G06Q 30/06; G06Q 10/107; G06Q 30/0601; G06Q 30/02
See application file for complete search history.

(56) References Cited

U.S. PATENT DOCUMENTS

| 5,903,878 | A | * | 5/1999 | Talati et al. ................. 705/26.41 |
| 5,960,411 | A | * | 9/1999 | Hartman et al. ........... 705/26.81 |
| 6,101,485 | A | * | 8/2000 | Fortenberry et al. ........ 705/26.8 |

(Continued)

OTHER PUBLICATIONS

"How do I make a PayPal Donation Button?" posted on Jun. 24, 2009 at http://www.ivanwalsh.com/paypal/how-do-i-make-a-paypal-donation-button.*

(Continued)

*Primary Examiner* — Rutao Wu
*Assistant Examiner* — James Detweiler
(74) *Attorney, Agent, or Firm* — Volpe and Koenig, P.C.

(57) ABSTRACT

An electronic commerce (e-commerce) system may send advertisement emails to customers that are registered with the e-commerce system. The advertisement emails may include mailto hyperlinks. Each mailto hyperlink may be associated with a product that is being offered for sale, and each mailto hyperlink describes an email message that may be generated when that hyperlink is selected. When a mailto hyperlink is selected, the generated email message may include one or more parameters related to the product associated with the hyperlink, such as an identifier of the product. The generated email message may then be transmitted to the e-commerce system. The e-commerce system may receive the message and, based on the parameters in the received message, execute a transaction to purchase the identified product on behalf of the customer.

22 Claims, 14 Drawing Sheets

(51) Int. Cl.
*G06Q 20/12* (2012.01)
*H04L 12/58* (2006.01)

(56) References Cited

U.S. PATENT DOCUMENTS

| | | | |
|---|---|---|---|
| 8,156,012 B1* | 4/2012 | Eisner et al. | 705/26.81 |
| 2002/0103752 A1* | 8/2002 | Berger et al. | 705/39 |
| 2002/0120581 A1* | 8/2002 | Schiavone et al. | 705/64 |
| 2004/0024655 A1* | 2/2004 | Estes | 705/26 |
| 2005/0004867 A1* | 1/2005 | Spector | 705/39 |
| 2005/0044003 A1* | 2/2005 | O'Keeffe et al. | 705/26 |
| 2007/0022007 A1* | 1/2007 | Lawe | 705/14 |
| 2009/0276345 A1* | 11/2009 | Hughes | 705/34 |
| 2010/0010886 A1* | 1/2010 | Flynn, Jr. | 705/14.15 |

OTHER PUBLICATIONS

"PayPal Community Help Forum" posted on Feb. 20, 2011 at https://www.paypal-community.com/t5/Donations-and-Fundraising/website-with-different-donation-amounts/td-p/198966.*

"PayPal Developer—Getting Started with Donate Buttons" https://developer.paypal.com/docs/classic/paypal-payments-standard/integration-guide/donation_buttons/—Shown in Google Search to have originated in 2008.*

* cited by examiner

EMAIL-BASED E-COMMERCE

CROSS-REFERENCE TO RELATED APPLICATIONS

This application is a continuation of U.S. patent application Ser. No. 13/074,222, filed on Mar. 29, 2011 which is hereby incorporated by reference herein.

This application is related to U.S. patent application Ser. No. 13/074,235 entitled "EMAIL-BASED DONATIONS," filed on Mar. 29, 2011, which is hereby incorporated by reference herein.

BACKGROUND

According to many current approaches to electronic commerce (e-commerce), a customer may register with a vendor (such as an online retailer) to receive emails that provide information about products that are offered for sale by the vendor. The emails may include hyperlinks that direct the user to web pages on the vendor's web site. At the web site, the customer may obtain additional information about and/or purchase the products described in the emails.

If the customer originally received an email in a dedicated email application such as Microsoft Outlook, a different application (such as a web browser) must be used in order to view the web pages on the vendor's web site. Further, to purchase a product from the vendor's web site, customers are frequently required to enter payment information such as credit card information. Due to this switch to a different application and the entry of credit card information, the process of purchasing a product from the vendor becomes inconvenient and time-consuming. Further, when non-profit organizations conduct email marketing campaigns, the donation process may be similar to that described above, and may be fraught with similar problems. Therefore, more streamlined and convenient approaches to e-commerce would be advantageous.

SUMMARY

A method for use in an e-commerce system may include a database storing information that includes an identifier of a customer, an email address of the customer, and an identifier of a product offered by a vendor. The method may further include at least one processor generating an advertising email message. The advertising email message may be addressed to the email address of the customer, and may include a mailto hyperlink. The mailto hyperlink may include a destination address field that indicates an email address of the e-commerce system, and a body field that indicates an email body that includes the identifier of the customer and the identifier of the product. The method may further include a network interface transmitting the advertising email message, and the network interface receiving an order email message. The order email message may indicate an order by the customer for the product. The order email message may be responsive to the advertising email message, and may be addressed to the email address of the e-commerce system. The body of the order email message may include the identifier of the customer and the identifier of the product. The at least one processor and the network interface may perform an order execution procedure based on the order email message, wherein the order execution procedure includes purchasing the product for the customer.

An e-commerce system may include a database, at least one processor, and a network interface. The database may be configured to store information that includes an identifier of a customer, an email address of the customer, and an identifier of a product offered by a vendor. The at least one processor may be configured to generate an advertising email message that is addressed to the email address of the customer, and includes a mailto hyperlink. The mailto hyperlink may include a destination address field that indicates an email address of the e-commerce system, and a body field that indicates an email body that includes the identifier of the customer and the identifier of the product. The network interface may be configured to transmit the advertising email message and to receive an order email message. The order email message may indicate an order by the customer for the product. The order email message may be responsive to the advertising email message, and may be addressed to the email address of the e-commerce system. The body of the order email message may include the identifier of the customer and the identifier of the product. The at least one processor and the network interface may be further configured to perform an order execution procedure based on the order email message, wherein the order execution procedure includes purchasing the product for the customer.

A computer-readable storage medium having processor-executable instructions stored thereon which, when executed by at least one processor in an e-commerce system, will cause the at least one processor to perform a method. The method may include storing information that includes an identifier of a customer, an email address of the customer, and an identifier of a product offered by a vendor. The method may further include generating an advertising email message, wherein the advertising email message is addressed to the email address of the customer, and includes a mailto hyperlink. The mailto hyperlink may includes a destination address field that indicates an email address of the e-commerce system and a body field that indicates an email body that includes the identifier of the customer and the identifier of the product. The method may further include transmitting, via a network interface, the advertising email message. The method may further include receiving, via the network interface, an order email message. The order email message may be responsive to the advertising email message, and may be addressed to the email address of the e-commerce system. The body of the order email message may include the identifier of the customer and the identifier of the product. The method may further include performing an order execution procedure based on the order email message, wherein the order execution procedure includes purchasing the product for the customer.

BRIEF DESCRIPTION OF THE DRAWINGS

A more detailed understanding may be had from the following description, given by way of example in conjunction with the accompanying drawings wherein.

DETAILED DESCRIPTION

Figure 1:
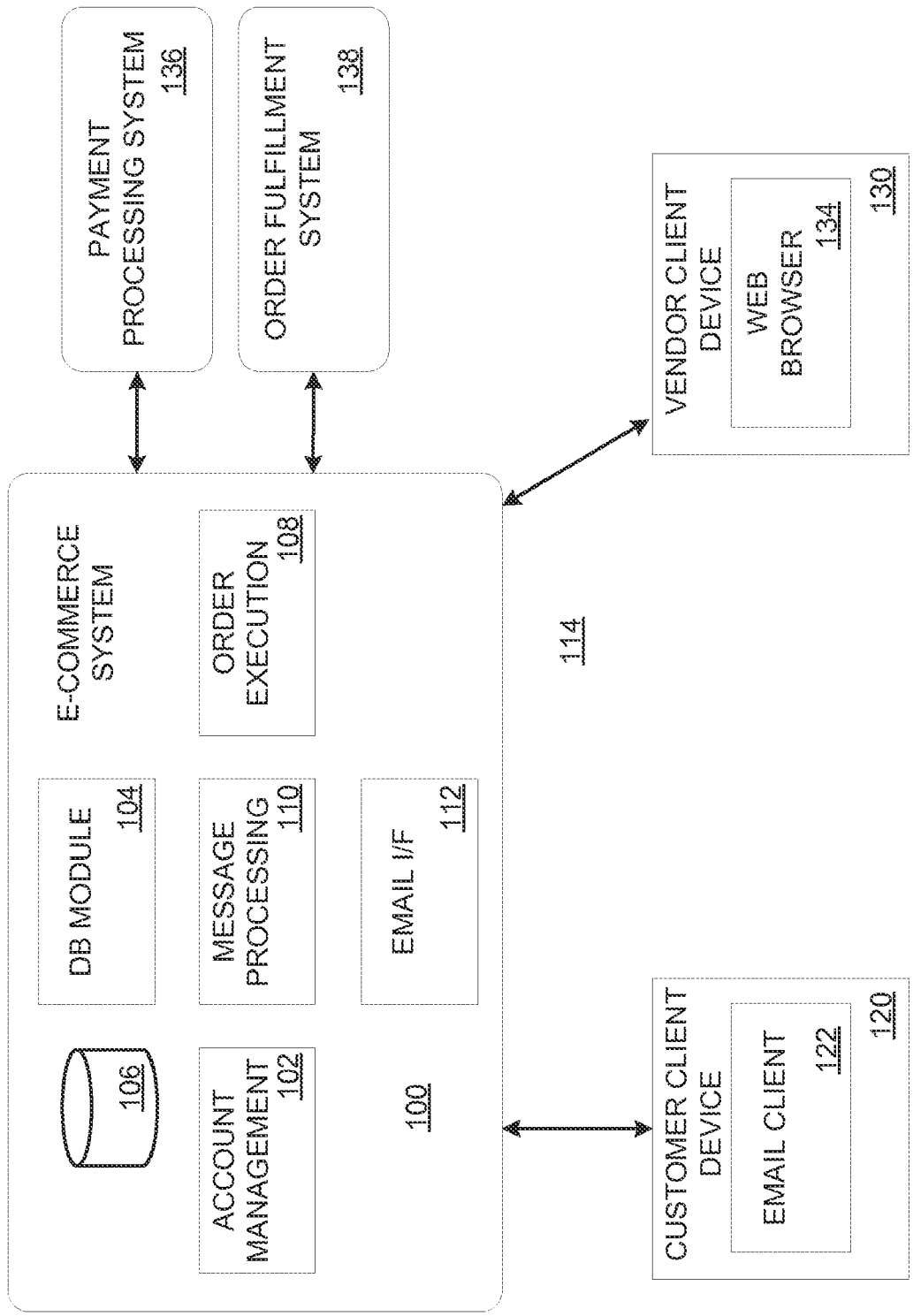
FIG. 1 shows a logical architecture for engaging in electronic commerce using email.

FIG. 1 shows an example logical architecture 114 for email-based e-commerce. The example architecture 114 may include a customer client device 120, an e-commerce system 100, a payment processing system 136, a vendor order fulfillment system 138, and a vendor client device 130. The e-commerce system 100 may include an account management module 102, a database module 104, an e-commerce database 106, a order execution module 108, a message processing module 110, and an email interface module 112. As will be described in further detail below, the e-commerce system 100 and customer client device 120 may exchange email messages to initiate and manage transactions such as donations to non-profit organizations and/or the purchase of goods. Also as will be described in further detail below, the e-commerce system 100 may communicate with the payment processing system 136 and the vendor order fulfillment system 138 to execute the transactions.

The account management module 102 in the e-commerce system 100 may manage data related to accounts for customers and vendors that participate in commerce via the e-commerce system 100. The account management module 102 may be or include, for example, a web application. Vendors may interact with the account management module 102 via a web browser such as the web browser module 134 in the vendor client device 130. As one example, a user of the vendor client device 130 may provide information to the account management module 102 such as: product and pricing information to be used for email advertisements to be sent to customers in email campaigns; email formatting information to be used for email advertisements to be sent to customers; financial information related to bank accounts and/or other types of financial accounts (such as e-Payment accounts such as PayPal accounts) that may be used to received payments from customers of the e-commerce system 100, such as account numbers and/or other identifying information; and/or other information. Customers may register with the e-commerce system 100 by interacting with the account management module 102 via a web browser such as a web browser module (not depicted) in the customer client device 120. A user of the customer client device 120 may provide information to the account management module 102 via the web browser such as: an email address associated with the customer; financial information associated with the customer, such as a credit card information (such as a credit card number and expiration date), and/or other information related to bank accounts and/or other types of financial accounts (such as e-Payment accounts) that may be used to make payments to vendors via the e-commerce system 100; shipping address information; billing address information; preferences regarding which vendors the customer would like to receive email advertisements from; and/or other information. The account management module 102 may, via the database module 104, store information received from the customer client device 120 and/or the vendor client device 130 in the e-commerce database 106. The account management module 102 may also add information to the e-commerce database 106 when customers and vendors register with the e-commerce system 100, such as customer identifiers, vendor identifiers, and other identifying information.

The message processing module 110 (in conjunction with the email interface module 112) may generate and transmit advertisement email messages to customers that are registered with the e-commerce system 100, such as the user of the customer client device 120. The advertisement email messages may be HyperText Markup Language (HTML) email messages, Rich Text Format (RTF) email messages, and/or may be defined according to any other appropriate format. The advertisement email messages may include Uniform Resource Identifiers (URIs) or hyperlinks that are defined according to the mailto URI scheme. Each mailto URI or hyperlink may describe an email message that may be generated by an email client module (such as the email client module 122) when that URI or hyperlink is selected. The generated message may include a number of parameters that indicate, for example, a product that was advertised in the advertisement email that the customer wishes to purchase. The generated message may then be sent to the e-commerce system 100, and received by the message processing module 110; when the generated message is received by the message processing module 110, the message processing module 110 may then initiate a transaction to purchase the product indicated in the message on behalf of the customer. In such an instance, the message processing module 110 may interact with the order execution module 108 to perform the transaction.

The email interface module 112 may be configured to use one or more email accounts that are associated with the e-commerce system 100, and to send and receive messages associated with the one or more email accounts. The email interface module 112 and/or the email client module 122 in the customer client device 120 may communicate email messages using technologies such as Simple Mail Transfer Protocol (SMTP), Post Office Protocol (POP) technology, Internet Message Access Protocol (IMAP), Remote Procedure Call (RPC) technology, HyperText Transfer Protocol (HTTP), and/or other appropriate technologies. The interface module 112 and/or the email client module 122 may use these technologies to transmit and/or receive email messages via one or more email servers (not depicted). The email client module 122 may be or include an email client such as Microsoft Outlook, Thunderbird, a web browser application, or any other client application for the communication of email messages. In an instance where the email client module 122 is or includes a web browser application, the email client module 122 may be the same web browser described above that may be used to communicate with the account management module 102; alternatively the email client module 122 and the web browser described above that may be used to communicate with the account management module 102 may be different.

The payment processing system 136 may be, as one example, a payment gateway that is operated by an acquiring financial institution. In an instance where the payment processing system is a payment gateway, the payment processing system 136 may have a connection to one or more banking networks (not depicted) that it may use to process payments. The order execution module 108 may communicate with the payment processing system 136 using technology such as Transport Layer Security (TLS) or Secure Sockets Layer (SSL) technology. The vendor order fulfillment system 138 may be an order management system (OMS), Enterprise Resource Planning (ERP), supply chain management, electronic purchasing system, inventory control system, or any other appropriate system for fulfilling orders.

The e-commerce database 106 may store information such as information that describes email campaigns, email advertisements that may be sent to customers, customer information, vendor information, product information, donation-related information, order status information, and/or other information. Further the e-commerce database 106 may store information that indicates correspondences between different email campaigns, advertisements, customers, vendors, products, donations, information related to order statuses, and/or other information. For each email campaign, the e-commerce database 106 may store information that include an identifier of the vendor associated with the campaign, identifiers of the products associated with the campaign, and/or other information. For each order that is placed with the e-commerce system 100, the e-commerce database 106 may store information such as an identifier of the customer that placed the order, when the order was placed, an identifier of the vendor associated with the order, and/or other information.

For each product described in the e-commerce database 106, the e-commerce database 106 may store information that includes an identifier of the product (or donation), a description of the product, a title of the product, an identifier of the vendor associated with the product, a cost of the product, and/or other information. According to one approach, data that describes donations may be handled within the e-commerce database in the primarily the same way as the data that describes products. As one example, the e-commerce database 106 may store information that indicates that a type of wine (e.g., "Wine One," with a product identifier of "0005") is sold by a vendor (e.g., "The Wine Shop," with a vendor identifier of "0163") for $15.00. Further, the e-commerce database may also store information that indicates that an example vendor that is a non-profit organization (e.g., "Charitable Organization," with a vendor identifier of "1043") may receive donations for $5.00, $10.00, $25.00, $50.00, and $100.00. Each of the different donation amounts may be stored in the e-commerce database 106 as a different product. For example, the $100 donation may have a product identifier (or "donation identifier") of "0099." Further according to this example, the e-commerce database 106 may store information that indicates that the product with identifier "0099" indicates a donation of $100.00 to a vendor with the identifier of "1043." Alternatively or additionally, the e-commerce database 106 may store information (e.g., one or more flags or other fields) that indicates, for each product/donation, whether the product/donation relates to a donation or to a purchase of goods.

The e-commerce database 106 may be spread across one or any number of computer-readable storage media (not depicted). The e-commerce database 106 may be or include, for example, a relational database, a hierarchical database, an object-oriented database, a flat file, a spreadsheet, or a structured file. The database module 104 may interface with a database management system (not depicted) in order to add data to, modify data in, or obtain data from the e-commerce database 106. Alternatively or additionally, the database module 104 may perform database driver and/or database client functionality to interact with the database management system. The database management system may be based on a technology such as Microsoft SQL Server, Microsoft Access, MySQL, PostgreSQL, Oracle Relational Database Management System (RDBMS), Not Only SQL (NoSQL), or any other appropriate technology.

Each or any combination of the modules described above with reference to FIG. 1 (including the account management module 102, database module 104, order execution module 108, message processing module 110, email interface module 112, email client module 122, web browser module 134, and the web browser module in the customer client device 120) may be implemented as software modules, specific-purpose processor elements, or as combinations thereof. Suitable software modules include, by way of example, an executable program, a function, a method call, a procedure, a routine or sub-routine, one or more processor-executable instructions, an object, or a data structure. In addition or as an alternative to the features of these modules described above with reference to FIG. 1, these modules may perform functionality described below with reference to FIGS. 2A-13.

Figure 2A:
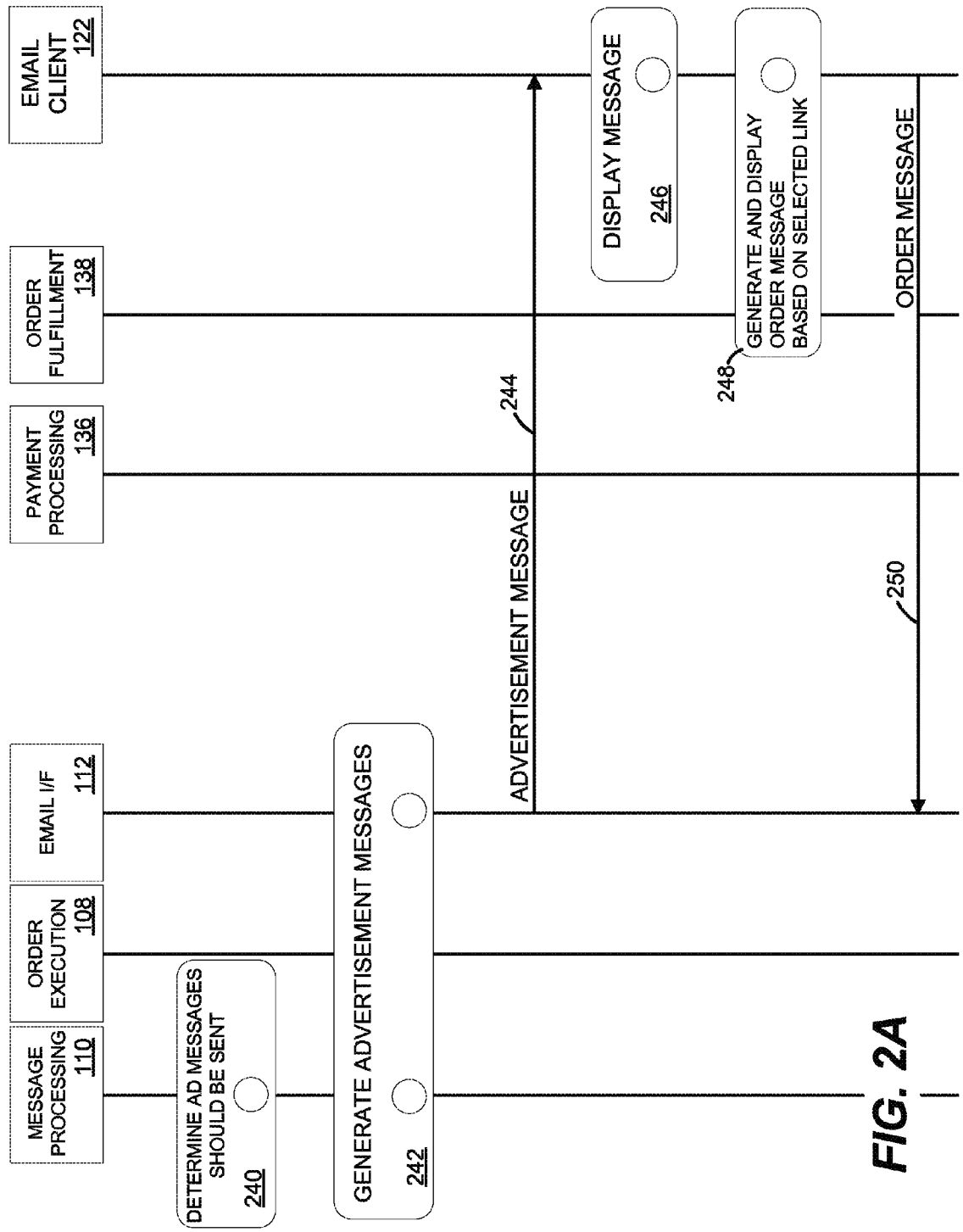
FIGS. 2A-2B show a method for engaging in electronic commerce using email.
Figure 2B:
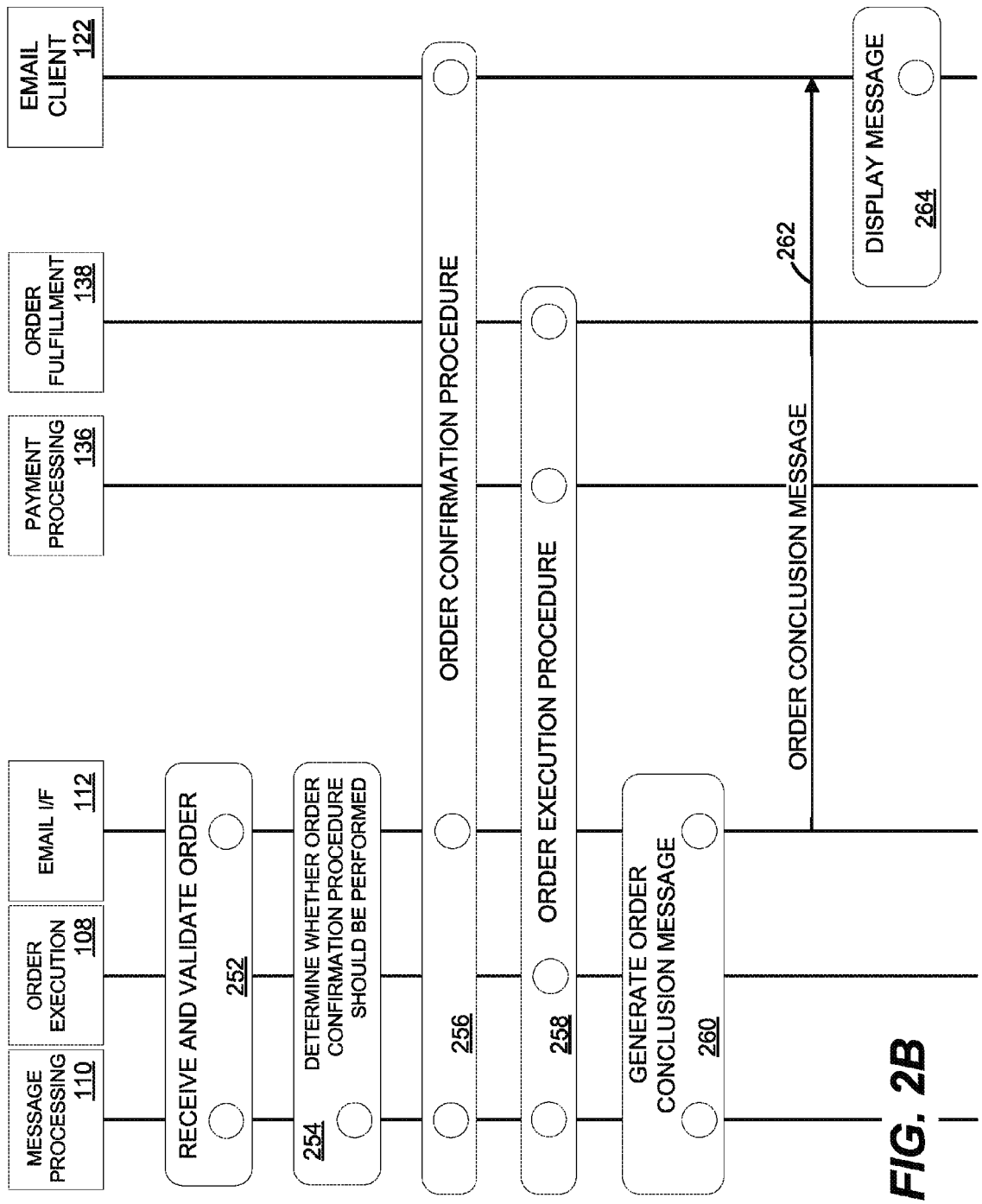

FIGS. 2A-2B show an example method for email-based electronic commerce. FIGS. 2A-2B show components of the e-commerce system 100, including the message processing module 110, the order execution module 108, and the email interface module 112. FIGS. 2A-2B also show the email client module 122 of the customer client device 120, as well as the payment processing system 136 and the vendor order fulfillment system 138.

The method of FIGS. 2A-2B may begin with the message processing module 110 determining that an advertising email message should be sent to customers of the e-commerce system 100 (step 240). This determination may be based on, for example, information provided by a user of the vendor client device 130 to account management module 102 in the e-commerce system 100 via the web browser module 134 in the vendor client device 130. This information may include, for example, an instruction that indicates that the advertising email message should be sent. Alternatively or additionally, this information may include information that defines an email campaign. Information that defines an email campaign may include information that describes the format and contents of the advertising email message. For example, the information may indicate the products that should be indicated in the advertising email message, the quantities in which they may be bought, prices for the products, and/or other information. Alternatively or additionally, in an instance where the advertising message is a solicitation for a donation to a non-profit organization, this information may describe amounts of suggested donations. Information that defines the email campaign may also include parameters that define customers to whom the advertising emails should be sent. For example, a campaign may be defined such that the advertising emails will be sent only to users who have not purchased an item from the vendor since a given time period.

The message processing module 110 and/or the email interface module 112 may then generate the advertising email messages that are to be transmitted according to the information that describes the email campaign (step 242). This may include, for example, the message processing module 110 obtaining information from the e-commerce database 106 via the database module 104 that indicates a list of email addresses and other identifying information (such as customer identifiers) for customers that are the intended recipients of the email messages as described in the email campaign information. The advertising email messages may indicate that they are being sent by one of the email accounts used by the e-commerce system 100. This may also include the message processing module 110 assigning an email campaign identifier that is associated with this email campaign.

Further, the email messages generated by the message processing module 110 may include one or more mailto hyperlinks that define the contents of email messages that are generated when the mailto hyperlinks are selected. For example, and as will be described in further detail below, the message processing module 110 may generate the contents of the mailto hyperlinks such that the hyperlinks include information that identifies products that are being sold by a vendor. When the mailto hyperlinks are selected, new email messages are generated that may be used to initiate orders to purchase the identified products.

Mailto hyperlinks in the advertising email messages may include one or any combination of the following fields: a "mailto:" and/or "to" field that indicate one or more email addresses of recipients of the new message; a "Copy To" or "CC" field that indicates one or more email addresses of recipients to whom a copy of the new message should be sent; a "Blind Copy To" or "BCC" field that indicates one or more email addresses of recipients to whom a blind copy of the new message should be sent; a field that indicates the subject of the new message; and a field that indicates the body of the new message. The mailto hyperlinks may be defined according to the format described in Internet Engineering Task Force (IETF) RFC2368, which is incorporated by reference as if fully set forth herein.

The email interface module 112 may then transmit one of the generated advertising email messages to the email client module 122 (step 244). The email message may be received by the email client module 122 and displayed by the email client module 122 (step 246).

Figure 3:
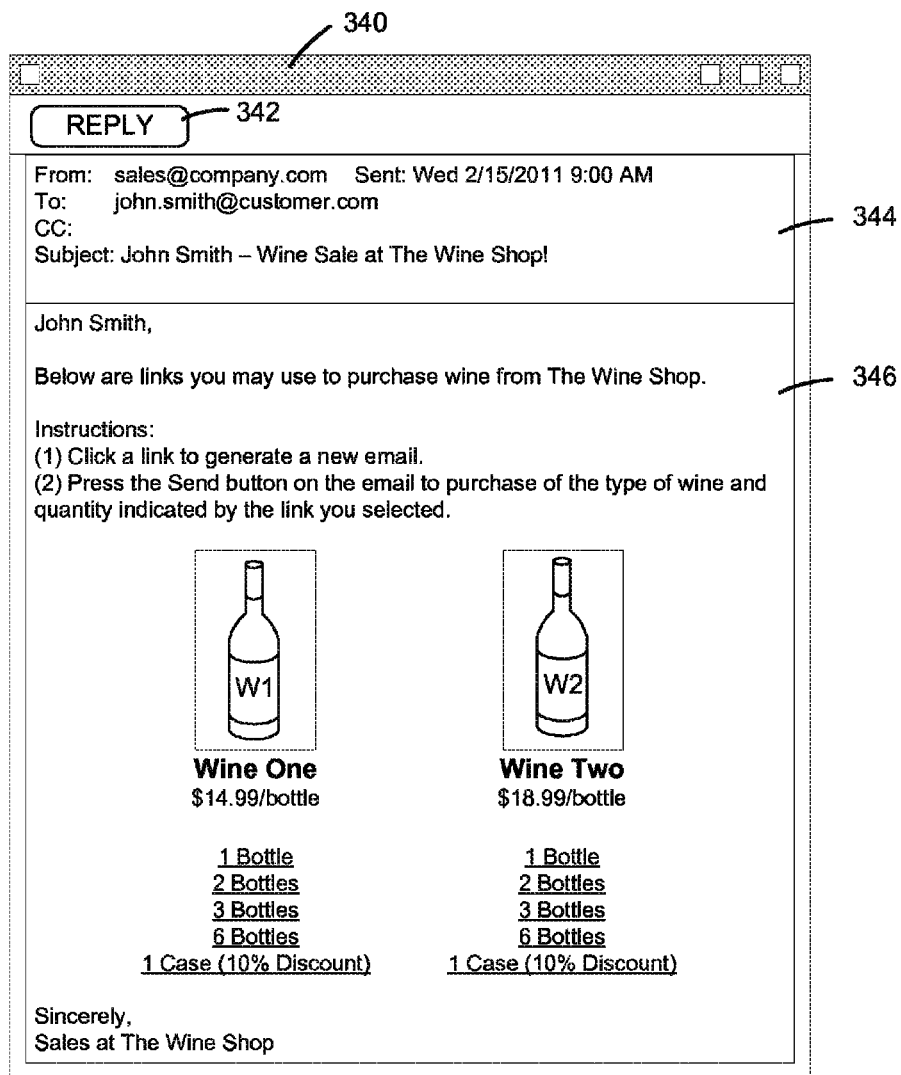
FIG. 3 shows an example advertisement email message that solicits the purchase of goods from a vendor.

Referring now to both FIG. 2A and FIG. 3, FIG. 3 shows an email display window 340 that may be used by the email client module 122 to display a first example email message from the message processing module 110 (step 246). The email display window 340 may include a Reply button 342, a control area 344, and a message body area 346. The control area 344 may display control and/or header information associated with the email message, such as the email addresses of the sender and recipient of the message. According to this example, the control area 344 shows that the sender of the message has the email address "sales@company.com." This is an email address that may be associated with an account used by the e-commerce system 100 for the communication of email messages. Further to this example, the control area 344 shows that the email address of the example recipient of the message (John Smith) is "john.smith@customer.com." The control area 344 may also display information such as a subject of the email message and the time the email message was sent. The Reply button 342 may respond to user input to generate a new display element (not depicted) to respond to the email message.

The message body area 346 may display the body of the email message. As shown in FIG. 3, the message body area 346 may display an example email message that shows information related to two example products (Wine One and Wine Two) that are being offered for sale by an example vendor (The Wine Shop). The message body area 346 includes a picture of a bottle of each type of wine, as well as the price for a bottle of each type of wine. The message body area 346 also includes, under the picture of the bottle of Wine One, a number of mailto hyperlinks, such as the "1 Bottle," "2 Bottles," "3 Bottles", "6 Bottles," and "1 Case (10% Discount)" links.

The message body area 346 also includes similar links under the picture of the bottle of Wine Two. These links may be defined according to the mailto URI scheme or other appropriate format, and each may describe a new email message that may be generated by the email client module 122 when that link is selected.

The "1 Bottle" hyperlink beneath the picture of the Wine One bottle may include information that describes an email message that, if received by the e-commerce system 100, will indicate to the e-commerce system 100 that John Smith would like to purchase one bottle of Wine One. As a further example, Wine One may have a product identifier of "0005," and John Smith may have a customer identifier of "0777." According to this example, the "1 Bottle" hyperlink may describe an email message that is addressed to an email account that is associated with the e-commerce system 100, and that includes a message body that includes the identifier for John Smith ("0777"), an identifier of the selected product ("0005"), and an identifier of the quantity that John Smith would like to order (in this example, a single bottle). Alternatively or additionally, the email message described by the hyperlink may include information such as text that describes the order, an identifier of the vendor (in this example, The Wine Shop), an email campaign identifier, and/or other information. Similarly, the "2 Bottles" hyperlink beneath the picture of the Wine One bottle may include information that describes an email message that, if received by the e-commerce system 100, will indicate to the e-commerce system 100 that John Smith would like to purchase two bottles of Wine One. According to this example, the "2 Bottles" hyperlink may be defined as follows:

```
<a href="mailto:sales@company.com?
subject=Purchase%20from%20Wine%20Shop%20&
body=You%20have%20created%20an%20order%20for%20two%20bottles%20o
f%20Wine%20One.%20Press%20the%20Send%20button%20to%20complete%
20the%20order.%0A%0AProductID0005%20QualifierNA%20Qty0002%20Cus
tomerID0777%20CampaignID0003"
target="_blank">2 Bottles</a>
```

Similarly, the "3 Bottles," "6 Bottles," and "1 Case (10% Discount)" hyperlinks beneath the picture of the Wine One bottle indicate corresponding information for three bottles, six bottles, and one case of bottles, respectively. Additionally, the "1 Bottle," "2 Bottles," "3 Bottles," "6 Bottles," and "1 Case (10% Discount)" hyperlinks under the Wine Two bottle indicate corresponding information for Wine Two as that described above with respect to the mailto hyperlinks relating to Wine One.

The email client module 122 may receive a user input that indicates that one of the hyperlinks displayed in the message body area 346 is selected. The user input may be, for example, a mouse click, keyboard input, or any other type of input that indicates that a hyperlink is selected. Referring again to FIG. 2A, the email client module 122 may, in response to this user input, generate and display an order email message as specified by the selected hyperlink (step 248).

Figure 4:
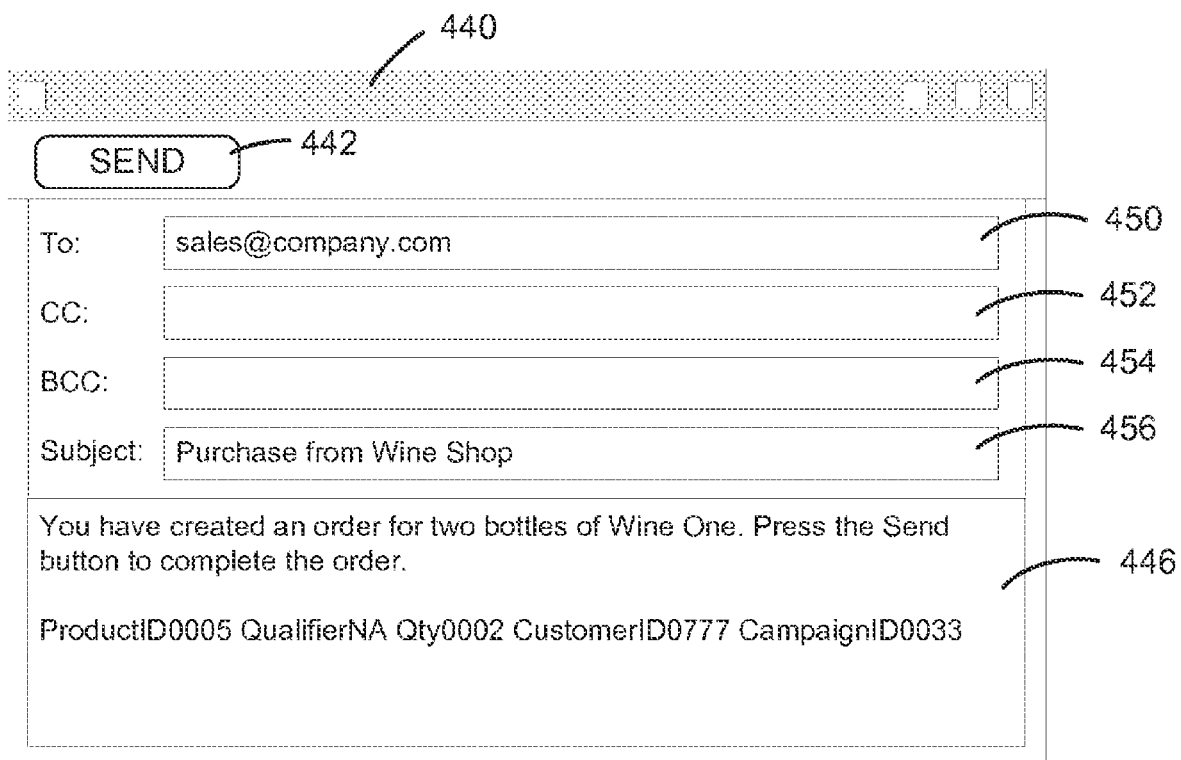
FIG. 4 shows an email message for placing an order.

Referring now to FIG. 2A, FIG. 3, and FIG. 4, FIG. 4 shows an example message composition window 440 that may be displayed in response to a selection of a hyperlink from the message body area 346 of the email display window 340 of FIG. 3 (step 248). The message composition window 440 of FIG. 4 may include a Send button 442, a To area 450, a CC area 452, a BCC area 454, a Subject area 456, and a message body area 446. The Send button 442 in the message composition window 440 of FIG. 4 may be responsive to input from a user such as a mouse click, keyboard input, or any other type of input. The different areas 446, 450, 452, 454, 456 in the message composition window 440 display different portions of an email message. For example, the To area 450 includes text that indicates email addresses to which the email message is addressed, while the message body area 446 displays the contents of the body of the email message. Each or any of these different areas 446, 450, 452, 454, 456 may be editable based on user input. Changes to the contents of these areas 446, 450, 452, 454, 456 may change the corresponding portion of the email message.

FIG. 4 shows an example wherein the "2 Bottles" hyperlink beneath the picture of the Wine One and described above with reference to FIG. 3 is selected. The To area 450 indicates that the message is addressed to sales@company.com. The Subject area 456 indicates that the subject of the message is "Purchase from Wine Shop." The CC area 452 and BCC area 454 are blank. Continuing the example of FIG. 3, Wine One product has a product identifier of "0005" and John Smith has a customer identifier of "0777." Accordingly, the message body area 446 includes the text "ProductID0005" and "CustomerID0777." To indicate that the user has selected the purchase of two bottles, the message body area 446 includes the text "Qty0002." Further, the message body area 446 includes the text "CampaignID0033," indicating that the order is associated with an email campaign with an identifier of "0033."

In an instance where a different hyperlink from the message body area 346 of FIG. 3 is selected, the display areas 446, 450, 452, 454, 456 in the message composition window 440 may include contents specified by the selected different hyperlink. For example, in an instance where a hyperlink related to Wine Two is selected, the message body area would not include the text "ProductID0005," but would include text that indicates the corresponding identifier for Wine Two.

Figure 5:
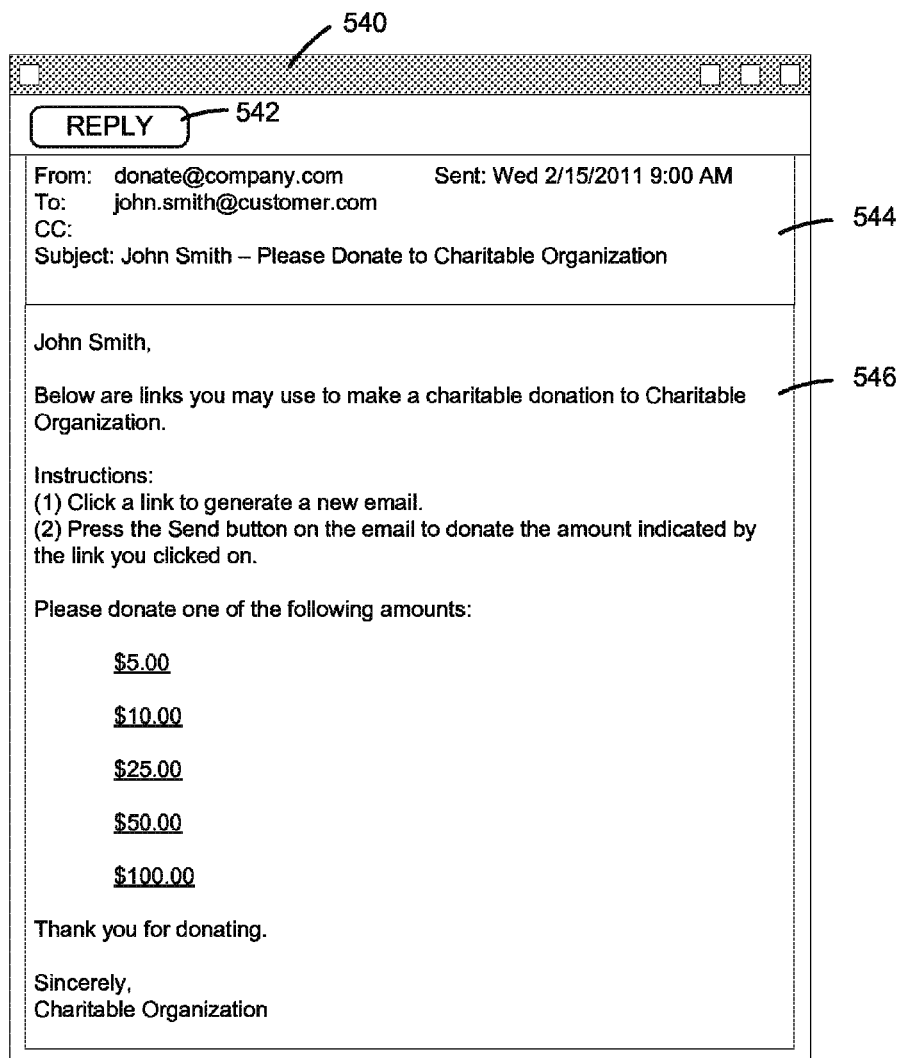
FIG. 5 shows an advertisement email message that solicits a donation to a non-profit organization.

Referring now to both FIG. 2A and FIG. 5, FIG. 5 shows an email display window 540 that may be used by the email client module 122 to display a second example email message from the message processing module 110 (step 246). The email display window 540 includes a Reply button 542, a control area 544, and a message body area 546. These display elements 542, 544, 546 may possess similar and/or analogous characteristics and/or perform similar functionality as corresponding display elements 342, 344, 346 in the email display window 340 of FIG. 3. According to the example of FIG. 5, the control area 544 shows that the sender of the message has the email address "donate@company.com." This is an email address that may be associated with an account used by the e-commerce system 100 for the communication of email messages. Further to this example, the control area 544 shows that the email address of the example recipient of the message (John Smith) is "john.smith@customer.com."

As shown in FIG. 5, the message body area 546 of the email display window 540 may display an example email message that shows information related the solicitation of donations for an example non-profit organization ("Charitable Organization"). The message body area 546 also includes mailto hyperlinks, such as the "$5.00," "$10.00," "$25.00," "$50.00," and "$100.00" hyperlinks. These hyperlinks may possess similar and/or analogous characteristics, and/or include similar and/or analogous information, as the mailto hyperlinks described above with reference to FIG. 3. The "$5.00" hyperlink describes an email message that, if received by the e-commerce system 100, will indicate to the e-commerce system 100 that John Smith would like to donate $5.00 to Charitable Organization. Similarly, the "$10.00," "$25.00," "$50.00, and "$100.00" hyperlinks describe email messages with corresponding information for $10.00, $25.00, $50.00, and $100.00 donations, respectively.

The email client module 122 may receive a user input that indicates that one of the hyperlinks displayed in the message body area 546 is selected. Referring again to FIG. 2A, the email client module 122 may, in response to this user input, generate and display an order email message as specified by the selected hyperlink (step 248).

Figure 6:
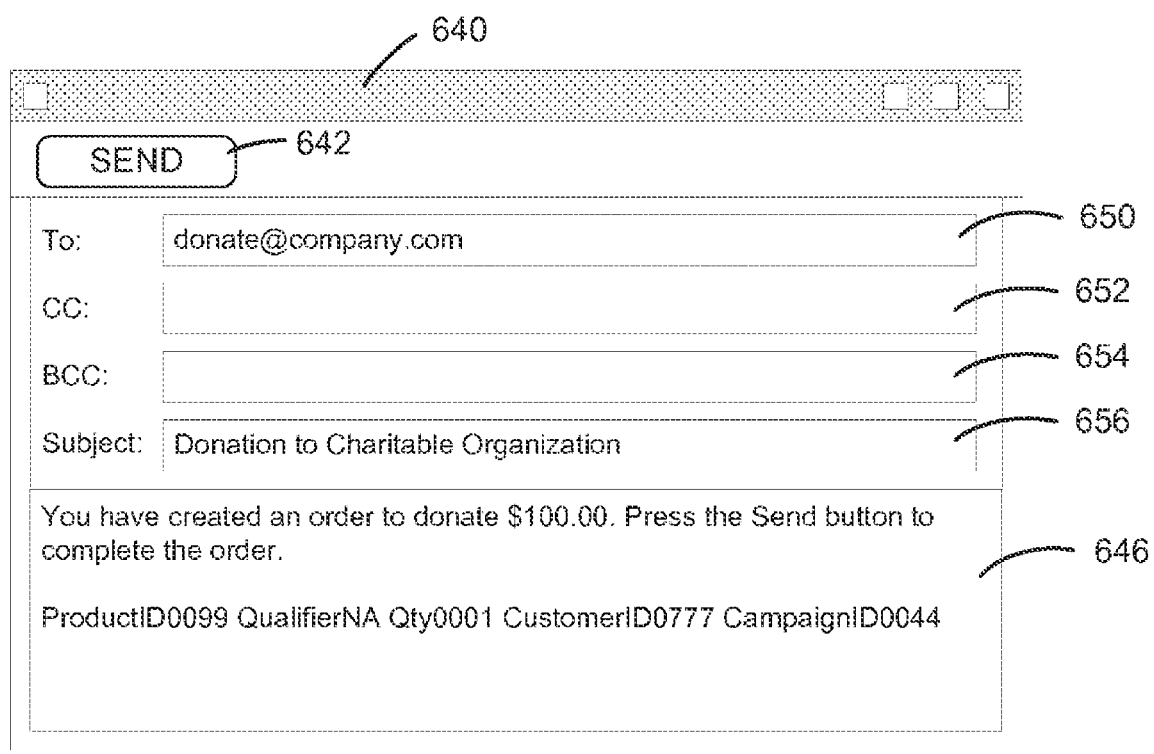
FIG. 6 shows an email message for ordering a donation to a non-profit organization.

Referring now to FIG. 2A, FIG. 5, and FIG. 6, FIG. 6 shows an example message composition window 640 that may be displayed in response to a selection of a hyperlink from the message body area 546 of the email display window 540 of FIG. 5 (step 248). The message composition window 640 of FIG. 6 may include a Send button 642, a To area 650, a CC area 652, a BCC area 654, a Subject area 656, and a message body area 646. These display elements 642, 650, 652, 654, 656, 646 may possess similar and/or analogous characteristics and/or perform similar functionality as corresponding display elements 442, 450, 452, 454, 456, 446 in the message composition window 440 of FIG. 4.

FIG. 6 shows an example wherein the "$100.00" hyperlink from the message body area 546 of the email display window 540 of FIG. 5 is selected. The To area 650 indicates that the message is addressed to donate@company.com. The Subject area 656 indicates that the subject of the message is "Donation to Charitable Organization." The CC area 652 and BCC area 654 are blank. According to this example, a donation of $100.00 to Charitable Organization has a product identifier of "0099," and John Smith has a customer identifier of "0777." Accordingly, the message body area 646 includes the text "ProductID0099" and "CustomerID0777." Further, the message body area 646 includes the text "CampaignID0044," indicating that the order is associated with an email campaign with an identifier of "0044."

Referring again to FIG. 2A, the email client module 122 may send the generated order email message to the e-commerce system 100 (step 250). This may be performed in response to input from a user of the customer client device 120. As one example, the email client module 122 may, in response to a selection of the Send button 442 in the message composition window 440 of FIG. 6, transmit an order email message based on the contents of the fields 446, 450, 452, 454, 456 in the message composition window 440. As another example, the email client module 122 may, in response to a selection of the Send button 642 in the message composition window 640 of FIG. 6, transmit an order email message based on the contents of the fields 646, 650, 652, 654, 656 in the message composition window 640.

Referring now to FIG. 2B, the email interface module 112 and the message processing module 110 may then receive the order email message (step 252). This may include, for example, the message processing module 110 periodically querying the email interface module 112 for information related to new messages received by the email interface module 112 for one or more of the email accounts used by the e-commerce system 100.

Further, the message processing module 110 may validate the contents of the order email message by determining if the message is formatted correctly and/or includes information that it should include. For example, the message processing module 110 may be configured to expect that the text of the body of the order email message should include information related to an order placed by a customer, such as an identifier of a customer that transmitted the message, a product identifier, an identifier that indicates a donation amount, an identifier of a vendor associated with the order, information that indicates a quantity associated with the order, a campaign identifier, and/or other information. In an instance where the message processing module 110 determines that the information included in the order email message is invalid (e.g., if one or more required pieces of information are missing and/or formatted incorrectly), the message processing module 110 may send one or more emails (not depicted) to the email address from which the order email message was received, indicating that the order email message could not be correctly processed.

Alternatively or additionally, the message processing module 110 may validate the contents of the order email message by determining whether it includes information that matches data stored in the e-commerce database 106. For example, the message processing module 110 may determine whether one or more identifiers (such as a customer identifier, product identifier, vendor identifier, or campaign identifier) in the message corresponds to a valid identifier in the e-commerce database 106. In an instance where the message processing module 110 determines that the information included in the order email message is invalid (e.g., if one or more of the identifiers in the message are not valid identifiers), the message processing module 110 may send one or more emails (not depicted) to the email address from which the order email message was received, indicating that the order email message could not be correctly processed.

The message processing module 110 may then determine whether an order confirmation procedure should be performed (step 254). This may be based on, for example, a parameter related to the vendor with which the order corresponding to the order email message is associated. For example, a vendor might configure the e-commerce system 100 such that all orders for that vendor do or do not require an order confirmation before the orders are processed. This information may be provided to the account management module 102 in the e-commerce system 100 via, for example, the web browser module 134 in the vendor client device 130. The account management module 102 may store this information in the e-commerce database 106. To perform this determination, the message processing module 110 may determine which vendor to which the order pertains, based on a product identifier and/or vendor identifier include in the order email message. The message processing module 110 may then access the e-commerce database 106 via the database module 104 to determine whether this vendor has indicated whether an order confirmation is required before the order is processed.

Alternatively or additionally, the message processing module 110 may determine whether an order confirmation procedure should be performed based on the nature of the order (step 254). For example, the message processing module may be configured to determine that orders that do not require fulfillment of an order by a merchant (for example, orders that relate only to a donation or other pure exchange of funds) do not require an order confirmation procedure, while orders that relate to relate to the fulfillment of an order for tangible goods do require an order confirmation procedure.

In an instance where the message processing module 110 determines that an order confirmation procedure is required, the message processing module 110, email interface module 112, and the email client module 122 may perform an order confirmation procedure (step 256).

As one example, the order confirmation procedure (step 256) may include the transmission of one or more confirmation email messages (not depicted in FIG. 2B) from the message processing module 110 to the email client module 122) that indicates that the order has been received. These confirmation email messages may be generated by the message processing module 110, and transmitted to the email client module 122 via the email interface module 112. One example of such a confirmation email message is shown in FIG. 7.

Figure 7:
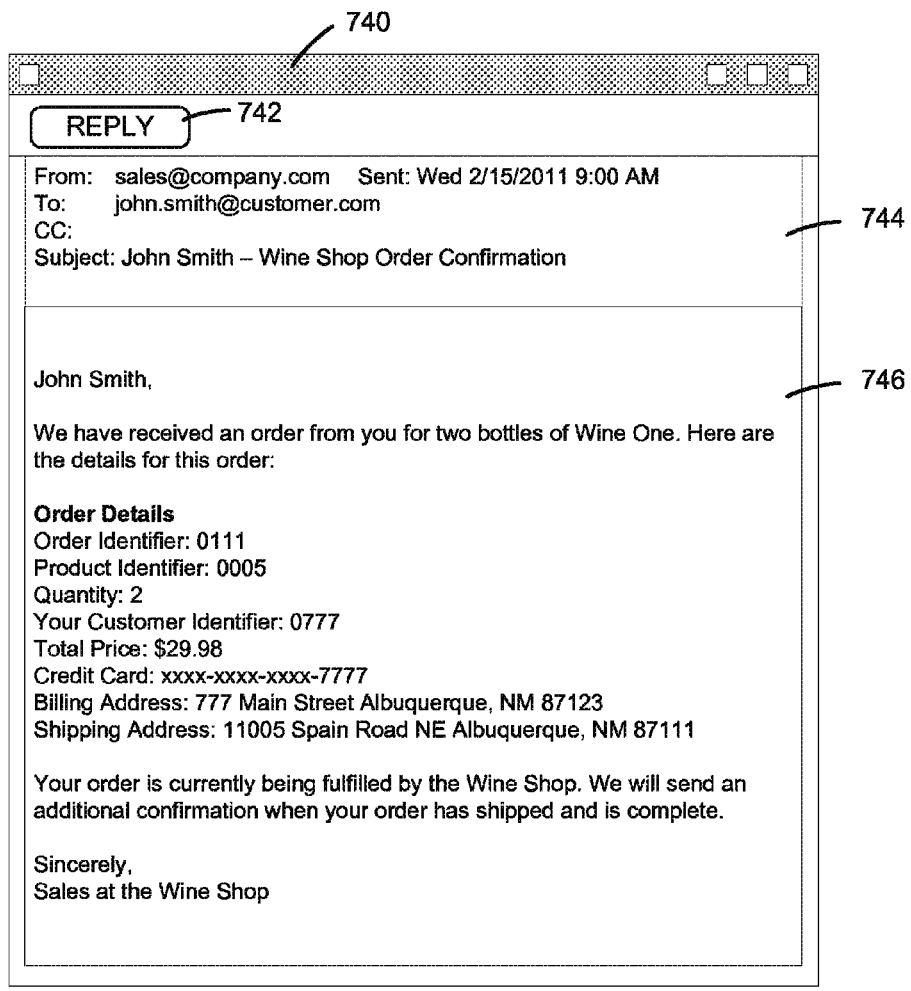
FIG. 7 shows a first order confirmation email message.

FIG. 7 shows an email display window 740 that may be used by the email client module 122 to display the example confirmation email message received from the message processing module 110. The email display window 740 includes a Reply button 742, a control area 744, and a message body area 746. These display elements 742, 744, 746 may possess similar and/or analogous characteristics and/or perform similar functionality as corresponding display elements 342, 344, 346 in the email display window 340 of FIG. 3.

Alternatively or additionally, during the order confirmation procedure (step 256), the message processing module 110 (in conjunction with the email interface module 112) may exchange one or more email messages with the email client 122, in order to determine whether the order should be canceled, or whether the order should be executed. In such an instance, the message processing module 110 and/or the order execution module 108 may determine, based on the exchange email messages, whether the order should be executed.

Alternatively or additionally, the order confirmation procedure (step 256) may be or include the any or any combination of the actions shown in FIG. 8, which is described in further detail below.

In an instance where the message processing module 110 and/or the order execution module 108 make a determination that the order should be executed, or in an instance where an order confirmation procedure is not performed, and/or in any other appropriate context, an order execution procedure may be performed, to complete the order indicated in the order email message (step 258). The message processing module 110, the order execution module 108, the payment processing module 136, and/or the vendor order fulfillment system 138 may participate in the order execution procedure (step 258).

The order execution procedure may include, for example, the order execution module 108 accessing credit card account and/or other financial information related to the customer that is stored in the e-commerce database 106 via the database module 104. This may also include the order execution module accessing bank account and/or other financial information related to the vendor that is stored in the e-commerce database 106 via the database module. The order execution module 108 may transmit the financial information related to both the customer and the vendor to the payment processing system 136, indicating that a payment should be made from the account of the customer to the account of the vendor.

Alternatively or additionally, an example order execution procedure may include one or more of the following actions: The order execution module 108 may access the order email message, which may include an identifier of the customer and a donation identifier/product identifier. Based on the donation identifier, the order execution module 108 may determine the non-profit organization to which the donation indicated in the order email message is intended. Further, the order execution module 108 may determine, based on the donation identifier, the amount to be donated. The order execution module 108 may determine the non-profit organization to which the donation indicated in the order email message is intended and the amount to be donated by, for example, querying the e-commerce database 106 (via the database module). Further, the order execution module 108 may perform a query of the e-commerce database 106 (via the database module 104) to obtain financial information for the customer and the non-profit organization. The query to the e-commerce database 106 for the customer's financial information may include the identifier of the customer, and the response to the query may be the customer's financial information. Similarly, the query to the e-commerce database 106 may include the identifier of the vendor, and the response to the query may be the vendor's financial information The financial information for the customer may include, for example, credit card information (such as a credit card number and expiration date), and/or other information related to a bank account and/or other type of financial accounts (such as an e-Payment account). The financial information for the vendor may include information related to a bank account and/or other types of financial account (such as an e-Payment account) held by the vendor. The order execution module 108 may transmit the financial information related to both the customer and the vendor to the payment processing system 136. As one example, the transmitted financial information may include an account number of the vendor and the credit card number and expiration date for a credit card account held by the customer, and the transmitted financial information may indicate that payment should be made to the to the identified account of the vendor from the credit card account of the customer for the amount indicated in the order email message.

Alternatively or additionally, the order execution procedure may include the order execution module 108 sending one or more messages to the vendor order fulfillment system 138 related to the order. For example, the order execution module 108 may send one or more messages to the vendor order fulfillment system 138 that indicate information such as the shipping address of the customer, an identifier of the items being ordered, a quantity of the items being ordered, and/or other information. Additionally, the vendor order fulfillment system 138 may communicate one or more messages to the order execution module 108 that indicate status updates with respect to fulfillment of the order. For example, the vendor order fulfillment system 138 may send one or more messages to the order execution module 108 that indicate milestones in the fulfillment of the order (e.g., that the goods involved in the order have shipped), and/or that fulfillment of the order is complete.

Alternatively or additionally, the order execution procedure may be or include any or any combination of the actions shown in FIG. 12, which is described in further detail below.

The message processing module 110 and/or the email interface module 112 may then generate an order conclusion email message (step 260). The order conclusion email message may indicate, for example, that the order was successfully completed, whether an error occurred that prevented successful completion of the order, that the order was canceled, and/or other information. The email interface module 112 may then transmit the order conclusion email message to the email client 122 (step 262) in the customer client device 120. The email client 122 may then receive and display the order conclusion email message (step 264). The email client 122 may display the order conclusion email message in an email display window (not depicted), with similar and/or analogous characteristics to the email display window 740 described above with reference to FIG. 7.

Figure 8:
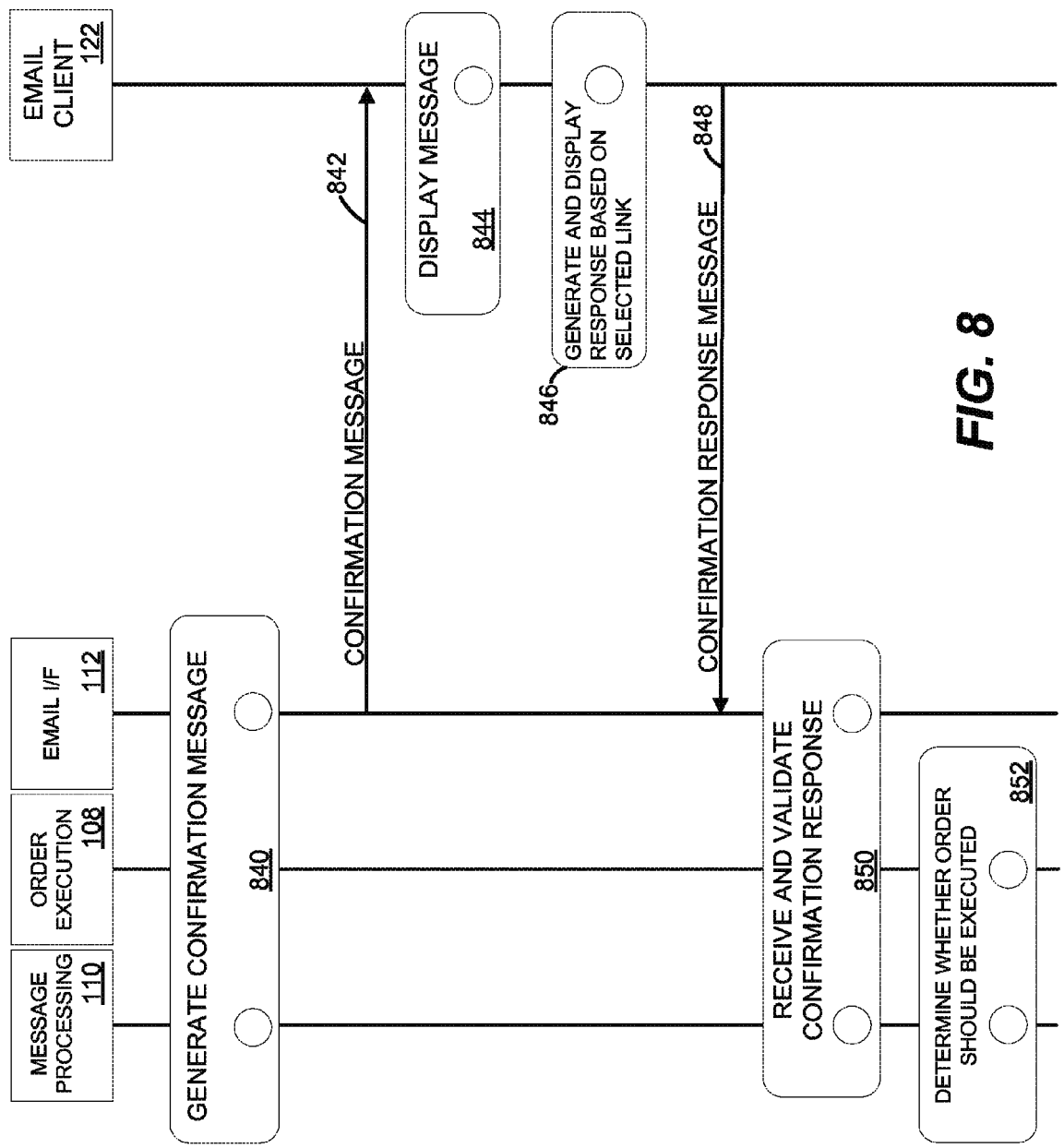
FIG. 8 shows an example order confirmation method.

FIG. 8 shows an example order confirmation method that may be used with the method of FIGS. 2A-2B, or in any other appropriate context. FIG. 8 shows components of the e-commerce system 100, including the message processing module 110, the order execution module 108, and the email interface module 112. FIG. 8 also shows the email client module 122 of the customer client device 120.

The method of FIG. 8 may begin with the message processing module 110 and/or the email interface module 112 generating a confirmation email message (step 840). The confirmation email message may include information that indicates that an order has been placed, and may invite the user of the email client module 122 to provide input as to whether the order should be completed or not. As will be described in further detail below, the confirmation email message may include one or more mailto hyperlinks that describe a confirmation response email message that indicates whether the order should be completed or not.

Generating the confirmation email message (step 840) may also include determining the email address to which the confirmation email message should be sent. As described above with reference to FIG. 1, the e-commerce database 106 may store information that includes a customer identifier and an email address for each customer. According to a first approach for determining the email address to which the confirmation email message should be sent, the message processing module 110 may determine the customer identifier associated with the order that is being confirmed. The message processing module may then obtain from the e-commerce database 106 (via the database module 104) the email address that is stored in the database that is associated with the customer identifier. According to this approach, the message processing module 110 may generate the confirmation email message such that it is addressed to the email address that is stored in the database that is associated with the customer identifier. According to this approach, it is possible that the email address from which the order email message was originally sent (as one example, as described above with respect to step 250 of FIG. 2A) will be different from the address to which the confirmation email message is sent. According to a second approach, the message processing module 110 may generate the confirmation email message, such that it is addressed to the same email address from which the order email message was originally sent.

The email interface module 112 may transmit the confirmation email message to the email client module 122 (step 842). The confirmation email message may be received by the email client module 122, and displayed by the email client module 122 (step 844).

Figure 9:
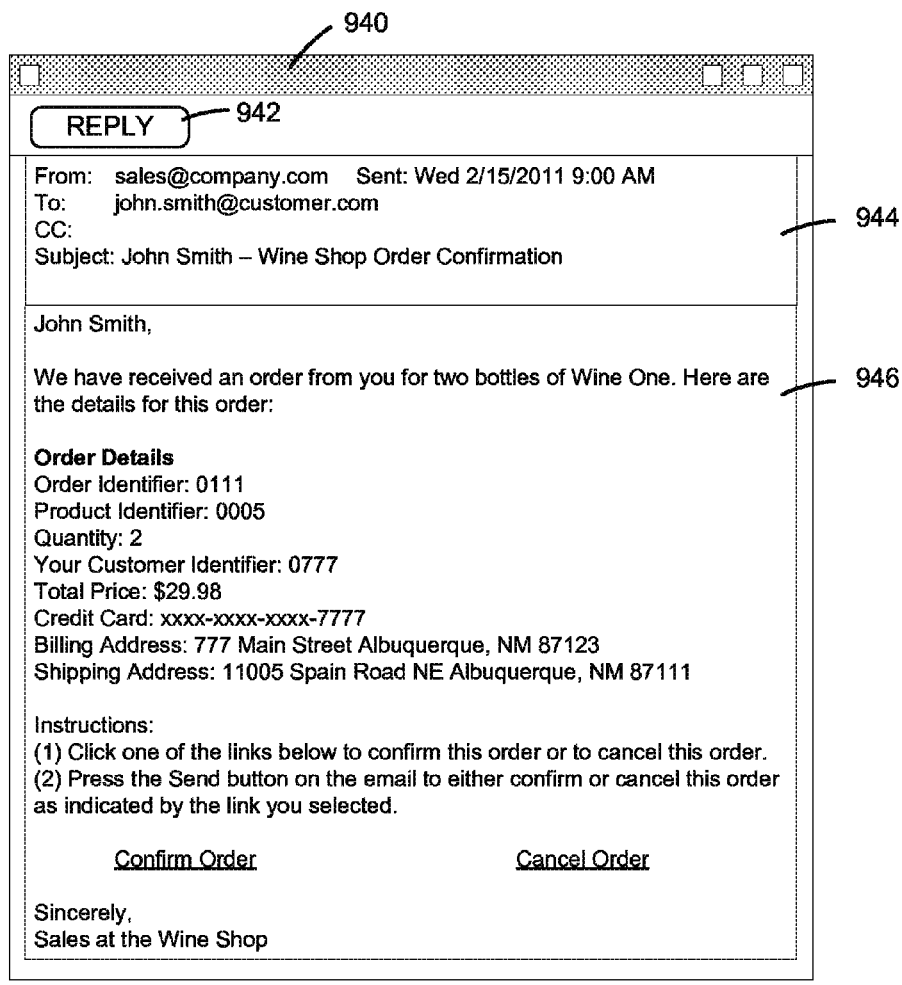
FIG. 9 shows a second order confirmation email message.

Referring now to both FIG. 8 and FIG. 9, FIG. 9 shows an email display window 940 that may be used by the email client module 122 to display an example confirmation email message (step 844). The email display window 940 includes a Reply button 942, a control area 944, and a message body area 946. These display elements 942, 944, 946 may possess similar and/or analogous characteristics and/or perform similar functionality as corresponding display elements 342, 344, 346 in the email display window 340 of FIG. 3. According to the example of FIG. 9, the control area 944 shows that the sender of the message has the email address "sales@company.com." This is an email address that may be associated with an account used by the e-commerce system 100 for the communication of email messages. Further to this example, the control area 944 shows that the email address of the recipient of the message (John Smith) is "john.smith@customer.com."

As shown in FIG. 9, the message body area 946 may include information that describes the order that is being confirmed. The message body area also includes mailto hyperlinks, such as the "Confirm Order" and "Cancel Order" links. The "Confirm Order" hyperlink describes an email message that, if received by the e-commerce system 100, will indicate to the e-commerce system 100 that John Smith would like to proceed with the order indicated by the example confirmation email message. The "Cancel Order" hyperlink describes an email message that, if received by the e-commerce system 100, will indicate to the e-commerce system 100 that John Smith would like to cancel the order indicated by the example confirmation email message.

The email client module 122 may receive a user input that indicates that one of the hyperlinks displayed in the message body area 946 is selected. The user input may be, for example, a mouse click, keyboard input, or any other type of input that indicates that a hyperlink is selected. Referring again to FIG. 8, the email client module 122 may, in response to this user input, generate and display a confirmation response email message as specified by the selected hyperlink (step 846).

Figure 10:
FIG. 10 shows an email message that may be used to confirm an order.

Referring now to FIG. 8, FIG. 9, and FIG. 10, FIG. 10 shows an example message composition window 1040 that may be displayed in response to a selection of the "Confirm Order" hyperlink from the message body area 946 of the email display window 940 of FIG. 9 (step 846). The message composition window 1040 of FIG. 10 may include a Send button 1042, a To area 1050, a CC area 1052, a BCC area 1054, a Subject area 1056, and a message body area 1046. These display elements 1042, 1050, 1052, 1054, 1056, 1046 may possess similar and/or analogous characteristics and/or perform similar functionality as corresponding display elements 442, 450, 452, 454, 456, 446 in the message composition window 440 of FIG. 4.

Figure 11:
FIG. 11 shows an email message that may be used to cancel an order.

Referring now to FIG. 8, FIG. 9, and FIG. 11, FIG. 11 shows an example message composition window 1140 that may be displayed in response to a selection of the "Cancel Order" hyperlink from the message body area 946 of the email display window 940 of FIG. 9 (step 846). The message composition window 1140 of FIG. 11 may include a Send button 1142, a To area 1150, a CC area 1152, a BCC area 1154, a Subject area 1156, and a message body area 1146. These display elements 1142, 1150, 1152, 1154, 1156, 1146 may possess similar and/or analogous characteristics and/or perform similar functionality as corresponding display elements 442, 450, 452, 454, 456, 446 in the message composition window 440 of FIG. 4.

Referring again to FIG. 8, the email client module 122 may send the generated confirmation response email message to the e-commerce system 100 (step 848). This may be performed in response to input from a user of the customer client device 120. As one example, the email client module 122 may, in response to a selection of the Send button 1042 in the message composition window 1040 of FIG. 11, transmit the email message based on the contents of the fields 1046, 1050, 1052, 1054, 1056 in the message composition window 1040. As another example, the email client module 122 may, in response to a selection of the Send button 1142 in the message composition window 1140 of FIG. 11, transmit the email message based on the contents of the fields 1146, 1150, 1152, 1154, 1156 in the message composition window 1140.

The email interface module 112 and the message processing module 110 may then receive the confirmation response email message (step 850). This may include, for example, the message processing module 110 periodically querying the email interface module 112 for information related to new messages received by the email interface module 112 for one or more of the email accounts used by the e-commerce system 100.

Further, the message processing module 110 may validate the contents of the confirmation response email message by determining if the message is formatted correctly and/or includes information that it should include. For example, the message processing module 110 may be configured to expect that the text of the confirmation response email message should include information that indicates an identifier of an order to which the confirmation response email message pertains. Alternatively or additionally, the message processing module 110 may validate the contents of the order email message by determining whether it includes information that matches data stored in the e-commerce database 106. For example, the message processing module 110 may determine whether an order identifier in the confirmation response email message corresponds to a valid order identifier. In an instance where the message processing module 110 determines that the information included in the order email message is invalid (e.g., if an order identifier in the message is not a valid order identifier), the message processing module 110 may send one or more emails (not depicted) to the email address from which the confirmation response email message was received, indicating that the confirmation response email message could not be correctly processed.

The message processing module 110 and/or the order execution module 108 may then determine whether the order should be executed (step 852). This may be based on, for example, the contents of the confirmation response email message. In an instance where the confirmation response email message indicates that the order should be canceled, the message processing module 110 and/or the order execution module 108 may determine that the order should be canceled. In an instance where the confirmation response email message indicates that the order should be executed, the message processing module 110 and/or the order execution module 108 may determine that the order should be executed.

Figure 12:
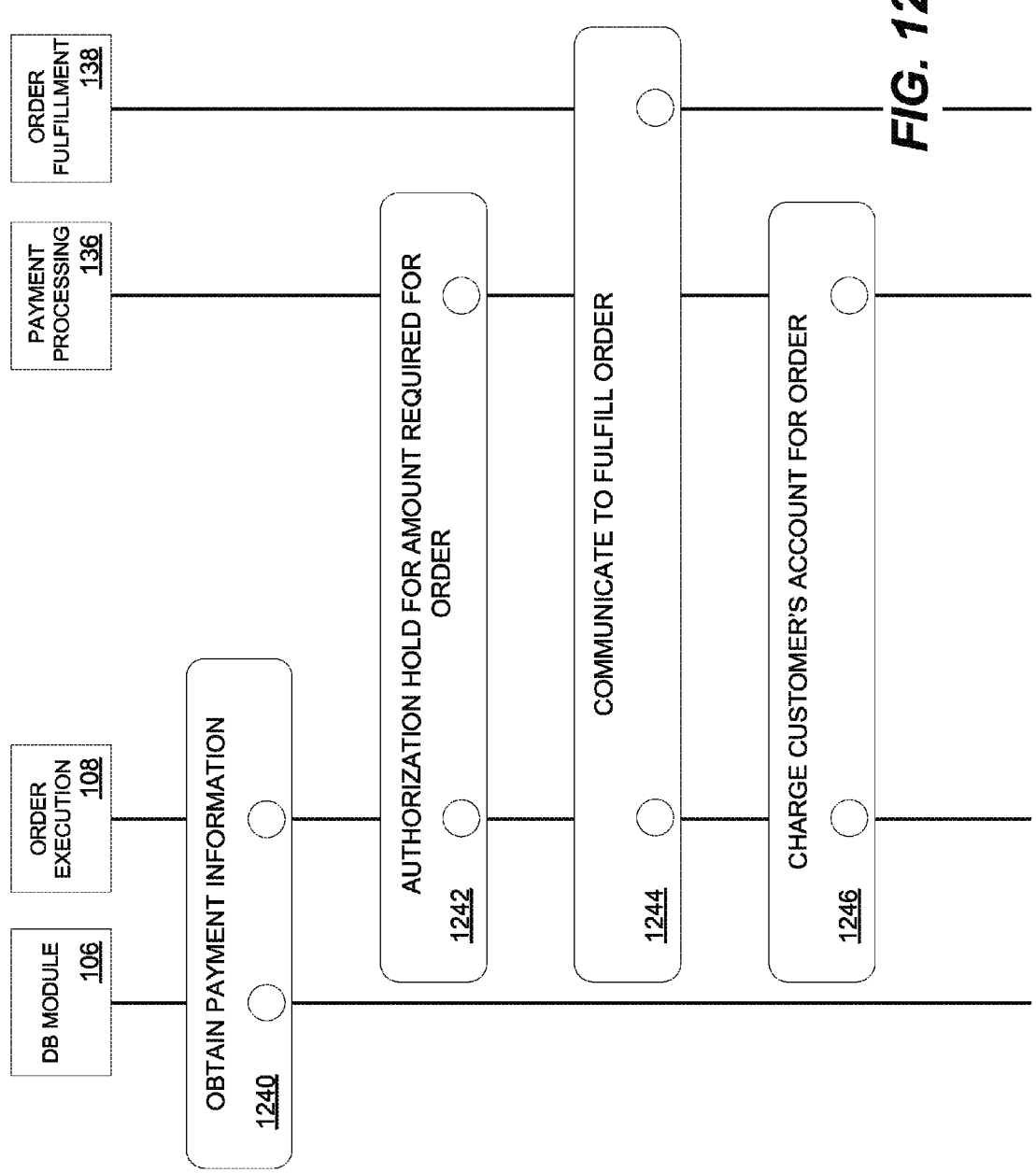
FIG. 12 shows an example order execution method.

FIG. 12 shows an example order execution method that may be used in conjunction with the method of FIGS. 2A-2B, or in any other appropriate context. FIG. 12 shows the order execution module 108 and the database module 104 of the e-commerce system 100, as well as the payment processing system 136 and the vendor order fulfillment system 138.

The method of FIG. 12 may begin with the order execution module 108 obtaining credit card information associated with the customer for whom the order will be executed (step 1240). This may include the obtaining the credit card information from the e-commerce database 106 via the database module 104. The credit card information may include a credit card number and an expiration date.

The order execution module 108 may then communicate with the payment processing module 136 to put a preauthorization hold on the customer's account for the amount required for the order (step 1242). This may include, for example, the order execution module 108 sending one or more messages to the payment processing system 136 that include the credit card information and the amount that should be held. This may also include the payment processing system 136 sending one or more messages to the order execution module 108 that indicate that the hold was successfully placed on the customer's account.

The order execution module 108 and the payment processing module 136 may then communicate to fulfill the order (step 1244). This may include, for example, the order execution module 108 sending one or more messages to the vendor order fulfillment system 138 that include information such as the shipping address of the customer, an identifier of the items being ordered, a quantity of the items being ordered, and/or other information. This may also include the vendor order fulfillment system 138 sending one or more messages to the order execution module 108 that indicate status updates with respect to fulfillment of the order. For example, the vendor order fulfillment system 138 may send one or more messages to the order execution module 108 that indicate progress with respect to the fulfillment of the order, and/or that fulfillment of the order is complete.

The order execution module 108 may then communicate with the payment processing system 136 to charge the customer's account for the amount associated with the order (step 1246). This may include the order execution module 108 sending one or more messages to the payment processing system that indicate that the customer's account should be charged for the amount associated with the order. This may also include the payment processing system 136 sending one or more messages to the order execution module 108 that indicate that the customer's account was successfully charged. Charging the customer's account (step 1246) maybe performed in response to the order execution module 108 receiving information from the vendor order fulfillment system 138 that indicates that the order has been completed. Alternatively, the order execution module 108 may determine that, if a preconfigured amount of time (e.g., forty-eight hours) has passed since an order had been first communicated to the order fulfillment system 138 (step 1244) and no error or cancellation messages had been received by the order execution module 108 from the order fulfillment system 138, the order had been successfully fulfilled and that the customer's account should be charged. The order execution module 1246 may then communicate with the payment processing system 136 to charge the customer's account in response to this determination. Alternatively or additionally, a vendor may communicate with the account management module 102 in the e-commerce system 100 to provide information via a web interface that indicates that an order has been fulfilled. In such an instance, the account management module 102 may store information in the e-commerce database 106 that indicates that the order has been fulfilled. The order execution module 108 may periodically obtain data from the e-commerce database via the database module 104 that reflects whether the order has been fulfilled. If the order execution module 108 obtains information that indicates that the order has been fulfilled, the order execution module 108 may determine that the customer's account should be charged; the order execution module 1246 may then communicate with the payment processing system 136 to charge the customer's account in response to this determination.

Figure 13:
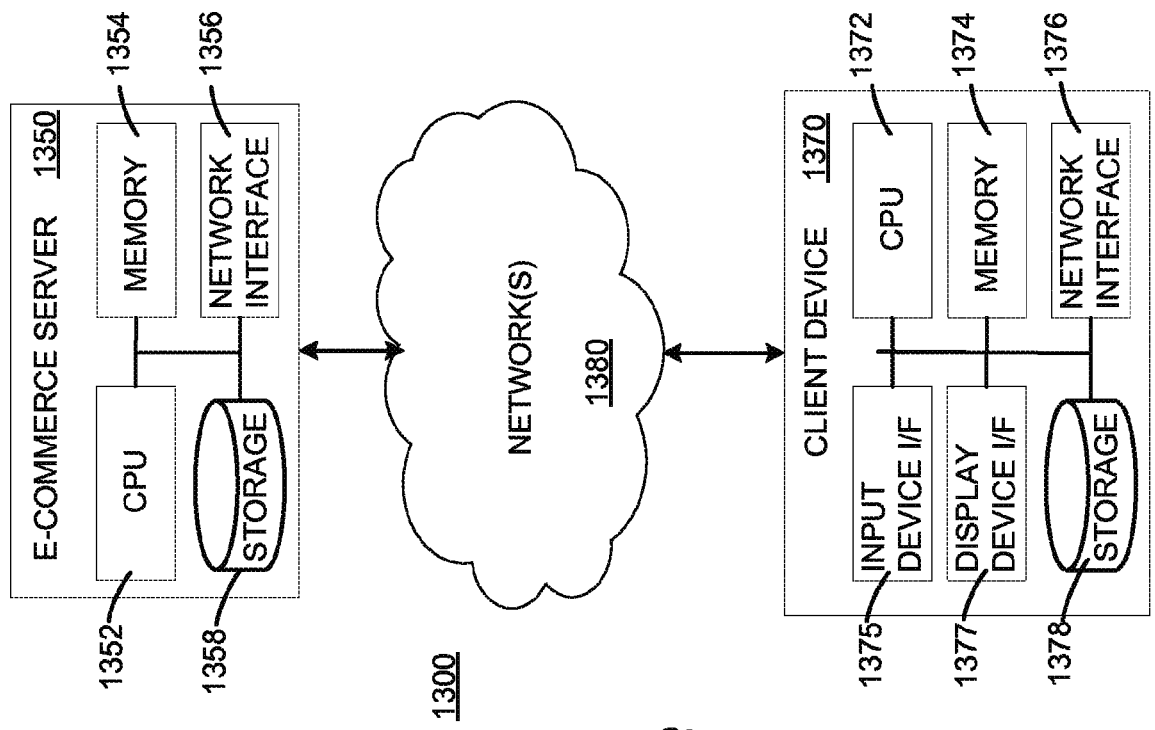
FIG. 13 shows an example system that may be used to implement features described herein with reference to FIGS. 1-12.

FIG. 13 shows an example system 1300 that may be used to implement features described above with respect to FIGS. 1-12. The example system 1300 includes an e-commerce server 1350, a client device 1370, and one or more networks 1380.

The e-commerce server 1350 may include at least one processor 1352, memory device 1354, network interface 1356, and storage device 1358. The client device 1370 may include at least one processor 1372, memory device 1374, network interface 1376, input device interface 1375, display device interface 1377, and storage device 1378.

The e-commerce server 1350 may be configured to perform any feature or combination of features described above with reference to FIGS. 1-12 as performed by the account management module 102, database module 104, order execution module 108, message processing module 110, and/or email interface module 112. The client device 1370 may be configured to perform any feature or combination of features described above with reference to FIGS. 1-12 as performed by the email client module 122 and/or the web browser module in the customer client device 120. The client device 1370 may be, for example, a desktop computer, a laptop computer, a netbook, a tablet computer, a personal digital assistant (PDA), a cellular phone, or any other appropriate device.

Each or any of the memory devices 1354, 1374 may be or include a device such as a Dynamic Random Access Memory (D-RAM), Static RAM (S-RAM), or other RAM or a flash memory. Each or any of the storage devices 1358, 1378 may be or include a hard disk, a magneto-optical medium, an optical medium such as a CD-ROM, a digital versatile disk (DVDs), or Blu-Ray disc (BD), or other type of device for electronic data storage. The storage device 1358 in the e-commerce server 1350 may store the information or any subset of the information described above with reference to FIGS. 1-12 as stored in the e-commerce database 106.

Each or any of the network interfaces 1356, 1376 may be, for example, a communications port, a wired transceiver, or a wireless transceiver. Each or any of the network interfaces 1356, 1376 may be capable of communicating using technologies such as Ethernet, fiber optics, microwave, xDSL (Digital Subscriber Line), Wireless Local Area Network (WLAN) technology, wireless cellular technology, and/or any other appropriate technology. The network interfaces 1356, 1376 may be used by the e-commerce server 1350 and/or the client device 1370 to communicate via the one or more networks 1380. The network interface in the e-commerce server 1350 may be configured to communicate any of the messages and/or other information described above with reference to FIGS. 1-12 as communicated by the account management module 102, database module 104, order execution module 108, message processing module 110, and/or email interface module 112. The network interface 1376 in the client device 1370 may be configured to communicate any of the messages and/or other information described above with reference to FIGS. 1-12 as communicated by the email client module 122 and/or by the web browser module in the customer client device 120 used for communicating with the account management module 102.

The one or more networks 1380 may include one or more private networks and/or one or more public networks such as the Internet. The one or more networks 1380 may be based on wired and/or wireless networking technologies.

The input device interface 1375 in the client device 1370 may be an interface configured to receive input from an input device such as a keyboard, a mouse, a trackball, a scanner, a touch screen, a touch pad, a stylus pad, and/or other device. The input device interface 1375 may operate using a technology such as Universal Serial Bus (USB), PS/2, Bluetooth, infrared, and/or other appropriate technology. The input device interface 1375 may be configured to receive any or any combination of the user input described above with reference to FIGS. 1-12 as received by the by the email client module 122 and/or by the web browser module in the customer client device 120 used for communicating with the account management module 102.

The display device interface 1377 may be an interface configured to communicate data to a display device (not depicted). The display device interface 1377 may operate using technology such as Video Graphics Array (VGA), Super VGA (S-VGA), Digital Visual Interface (DVI), High-Definition Multimedia Interface (HDMI), or other appropriate technology. The client device 1370 may include or be connected to a display device (not depicted) via the display device interface 1377. The display device may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device may be configured to display, based on data received via the display device interface 1377, any display elements described above with reference to FIGS. 1-12 as displayed by the email client module 122 and/or by the web browser module in the customer client device.

The memory device 1354 and/or the storage device 1358 of the e-commerce server 1350 may store instructions which, when executed by the at least one processor 1352, cause the at least one processor 1352 to perform any feature or combination of features described above with reference to FIGS. 1-12 as performed by the account management module 102, database module 104, order execution module 108, message processing module 110, and/or email interface module 112. The memory device 1374 and/or the storage device 1358 of the client device 1370 may store instructions which, when executed by the at least one processor 1372, cause the at least one processor 1372 to perform any feature or combination of features described above with reference to FIGS. 1-12 as performed by the email client module 122 and/or by the web browser module in the customer client device 120 used for communicating with the account management module 102.

Although FIG. 13 shows a single e-commerce server 1350 and a single client device 1370, the functionality described above with reference to FIG. 13 as performed by the e-commerce serve 1350 and/or the client device 1370 may be distributed across any number of devices that possesses similar characteristics and/or that include similar components 1352, 1354, 1356, 1358, 1372, 1374, 11375, 1376, 1377 as the e-commerce server 1350 and/or the client device 1370.

While examples are provided above with respect to FIGS. 1-13 which includes the use of email communications, the features described above with respect to FIGS. 1-13 may also be implemented using different types of communications technology. For example, the features described above with reference to FIGS. 1-13 may also be implemented, mutatis mutandis, using technologies that include any one or any combination of: email; instant messaging; enterprise messaging; Short Message Service (SMS); Multimedia Messaging Service (MMS); and/or any other appropriate technology for the electronic communication of data.

As use herein, the term "vendor" broadly refers to and is not limited to a business, a non-profit organization, any other type of organization, and/or an individual person. One example of a business is an online retailer. Examples of non-profit organizations include charitable organizations, educational institutions such as schools and universities, arts organizations, and recreational organizations. Examples of recreational organizations include historical or preservation societies, local recreational sports leagues.

As used herein, the term "processor" broadly refers to and is not limited to a single- or multi-core general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable storage medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Although features and elements are described above in particular combinations, each feature or element can be used alone or in any combination with or without the other features and elements. For example, each feature or element as described above with reference to 1-13 may be used alone without the other features and elements or in various combinations with or without other features and elements. Sub-elements of the methods and features described above with reference to FIG. 1-13 may be performed in any arbitrary order (including concurrently), in any combination or sub-combination.

What is claimed is:

1. A method for use in an electronic commerce (e-commerce) system having at least one processor, an email server and a database utilizing Simple Mail Transfer Protocol (SMTP) and an exchange of SMTP emails, the method comprising:

storing, by the database, information that includes an identifier of a customer, an email address of the customer, and a plurality of identifiers, each identifier related to a different product;

generating, by the at least one processor, an advertising SMTP email message that is addressed to the email address of the customer including:

a plurality of visible SMTP mailto links respectively associated with a plurality of predetermined and mutually different quantities of a specific product, wherein each visible SMTP mailto link includes:

associated non-visible unique identifying information including an SMTP email address of an email account of the e-commerce system and an associated one of the plurality of identifiers; and a visible indicia of a predetermined amount of a product corresponding to the identifier related to a specific product;

wherein each visible SMTP mailto link, upon selection, generates a unique order reply SMTP email message from the email address of the customer that includes only the non-visible unique identifying information from the associated one of the plurality of identifiers;

transmitting, by the email server, utilizing SMPT, the advertising SMTP email message to the email address of the customer;

receiving, by the email server, a unique order reply SMTP email message from the customer, wherein the message indicates an order by the customer for a specific product in a predetermined and mutually different quantity, wherein the unique order reply SMTP email message is responsive to the advertising SMTP email message, wherein the unique order reply SMTP email message is addressed to the email address of the e-commerce system, and the at least one processor and the email server performing an order execution procedure based on the received unique order SMTP email message, wherein the order execution procedure comprises transmitting, by the email server, one or more payment messages to a payment processing system to purchase the specific product in the predetermined and mutually different quantity for the customer.

2. The method of claim 1, further comprising:

storing, by the database, credit card information of the customer;

wherein the one or more payment messages include the credit card information of the customer, and wherein the payment processing system is a payment gateway that is operated by an acquiring financial institution.

3. The method of claim 1, wherein the order execution procedure comprises transmitting, by the email server, one or more fulfillment messages to an order fulfillment system.

4. The method of claim 1, further comprising:

determining, by the at least one processor, in response to the unique order reply SMTP email message, whether an order confirmation procedure should be performed; and performing the order confirmation procedure by the at least one processor and the email server, in response to a determination that the order confirmation should be performed.

5. The method of claim 4, wherein the order confirmation procedure comprises:
generating, by the at least one processor, a confirmation SMTP email message that is addressed to the email address of the customer and includes text that solicits the customer to confirm the unique order reply SMTP email message, wherein the confirmation SMTP email message includes a second mailto link that includes:
the email address of the e-commerce system; and
an order identifier associated with the unique order reply email message;
transmitting, by the email server, the confirmation SMTP email message;
receiving, by the email server, a confirmation response SMTP email message, wherein the confirmation response SMTP email message is responsive to the confirmation SMTP email message, wherein the confirmation response SMTP email message is addressed to the email address of the e-commerce system, and wherein the confirmation response SMTP email message includes the order identifier and information that indicates whether the order is confirmed or canceled; and
determining, by the at least one processor, whether the order execution procedure should be performed based on the information that indicates whether the order is confirmed or canceled.

6. An electronic commerce (e-commerce) system utilizing Simple Mail Transfer Protocol (SMTP) and an exchange of SMTP emails comprising:
a database configured to store information that includes an identifier of a customer, an email address of the customer, and a plurality of identifiers, each identifier related to a different product;
at least one processor configured to generate an advertising Simple Mail Transfer Protocol (SMTP) email message that is addressed to the email address of the customer and includes a plurality of visible SMTP mailto links respectively associated with a plurality of predetermined and mutually different quantities of a specific product, wherein each visible SMTP mailto link includes:
associated non-visible unique identifying information including an SMTP email address of an email of the e-commerce system and an associated one of the plurality of identifiers; and
a visible indicia of a predetermined amount of a product corresponding to the identifier related to a specific product;
wherein each visible SMTP mailto link, upon selection, generates a unique order reply SMTP email message from the email address of the customer that includes only the non-visible unique identifying information from the associated one of the plurality of identifiers;
an email server, utilizing SMTP, configured to transmit the advertising SMTP email message to the email address of the customer and to receive a unique order reply SMTP email message from the customer, wherein the unique order reply SMTP email message indicates an order by the customer for a specific product in a predetermined and mutually different quantity, wherein the unique order reply SMTP email message is responsive to the advertising SMTP email message, wherein the unique order reply SMTP email message is addressed to the email address of the e-commerce system; and
the at least one processor and the email server are further configured to perform an order execution procedure based on the order reply SMTP email message, wherein the order execution procedure includes transmitting, by the email server, one or more payment messages to a payment processing system to purchase the specific product in the predetermined and mutually different quantity for the customer.

7. The e-commerce system of claim 6, wherein:
the database is further configured to store credit card information of the customer;
the one or more payment messages include the credit card information of the customer; and
the payment processing system is a payment gateway that is operated by an acquiring financial institution.

8. The e-commerce system of claim 6, wherein the email server is further configured to perform the order execution procedure by transmitting one or more fulfillment messages to an order fulfillment system.

9. The e-commerce system of claim 6, wherein:
the at least one processor is further configured to determine, in response to the unique order reply SMTP email message, whether an order confirmation procedure should be performed; and
the at least one processor and the email server are further configured to perform the order confirmation procedure in response to a determination that the order confirmation procedure should be performed.

10. The e-commerce system of claim 9, wherein:
the at least one processor is further configured to generate a confirmation SMTP email message, wherein the confirmation SMTP email message includes text that solicits the customer to confirm the unique order reply SMTP email message, wherein the confirmation SMTP email message is addressed to the email address of the customer, and wherein the confirmation SMTP email message includes a second mailto link, wherein the second mailto link includes:
the email address of the e-commerce system; and
an order identifier associated with the unique order reply email message;
the email server is further configured to transmit the confirmation SMTP email message and to receive a confirmation response SMTP email, wherein the confirmation response SMTP email message is responsive to the confirmation SMTP email message, wherein the confirmation response SMTP email message is addressed to the email address of the e-commerce system, and wherein the confirmation response SMTP email message includes the order identifier and information that indicates whether the order is confirmed or canceled; and
the at least one processor is further configured to determine whether the order execution procedure should be performed based on the information that indicates whether the order is confirmed or canceled.

11. A method for use in an electronic commerce (e-commerce) system having at least one processor, an email server and a database utilizing Simple Mail Transfer Protocol (SMTP) and an exchange of SMTP emails, the method comprising:
storing, by the database, information that includes an identifier of a customer, an email address of the customer, and a plurality of identifiers, each identifier related to a different product;

generating, by the at least one processor, an advertising Simple Mail Transfer Protocol (SMTP) email message that is addressed to the email address of the customer and that includes a plurality of visible SMTP mailto links respectively associated with a plurality of predetermined and mutually different quantifies of a specific product, wherein each visible SMTP mailto link includes:
  associated non-visible unique identifying information including an SMTP email address of an email account of the e-commerce system and an associated one of the plurality of identifiers; and
  a visible indicia of a predetermined amount of a product corresponding to the identifier related to a specific product;
  wherein each visible SMTP mailto link, upon selection, generates a unique order reply SMTP email message from the email address of the customer that includes only the non-visible aim unique identifying information from the associated one of the plurality of identifiers;
transmitting, by the email server, utilizing SMTP, the advertising SMTP email message to the email address of the customer;
receiving, by the email server, a unique order reply SMTP email message from the customer that indicates an order by the customer for a specific product in a predetermined and mutually different quantity, wherein the unique order reply SMTP email message is responsive to the advertising SMTP email message, wherein the unique order reply SMTP email message is addressed to the email address of the e-commerce system; and
the at least one processor and the email server performing an order execution procedure based on the unique order SMTP email message, wherein the order execution procedure includes transmitting, by the email server, one or more payment messages to a payment processing system to purchase the specific product in the predetermined and mutually different quantity for the customer.

12. The method of claim 11, further comprising:
storing, by the database, credit card information of the customer;
wherein the one or more payment messages include the credit card information of the customer, and wherein the payment processing system is a payment gateway that is operated by an acquiring financial institution.

13. The method of claim 11, wherein the order execution procedure comprises transmitting, by the email server, one or more fulfillment messages to an order fulfillment system.

14. The method of claim 11, wherein the plurality of mailto links are further associated with a special offer.

15. The method of claim 11, further comprising the at least one processor periodically querying the email server for information related to the unique order reply SMTP email message.

16. The method of claim 11, further comprising:
determining, by the at least one processor, in response to the unique order reply SMTP email message, whether an order confirmation procedure should be performed; and
performing the order confirmation procedure by the at least one processor and the email server, in response to a determination that the order confirmation should be performed.

17. The method of claim 16, wherein the order confirmation procedure comprises:
generating, by the at least one processor, a confirmation SMTP email message that is addressed to the email address of the customer and includes text that solicits the customer to confirm the unique order reply email message, wherein the confirmation SMTP email message includes a second mailto link that includes:
  an email address of the e-commerce system; and
  an order identifier associated with the unique order reply SMTP email message;
transmitting, by the email server, the confirmation SMTP email message;
receiving, by the email server, a confirmation response SMTP email message, wherein the confirmation response SMTP email message is responsive to the confirmation SMTP email message, wherein the confirmation response SMTP email message is addressed to the email address of the e-commerce system, and wherein the confirmation response SMTP email message includes the order identifier and information that indicates whether the order is confirmed or canceled; and
determining, by the at least one processor, whether the order execution procedure should be performed based on the information that indicates whether the order is confirmed or canceled.

18. An electronic commerce (e-commerce) system utilizing Simple Mail Transfer Protocol (SMTP) and an exchange of SMTP emails comprising:
a database configured to store information that includes an identifier of a customer, an email address of the customer, and a plurality of identifiers, each identifier related to a different product;
at least one processor configured to generate an advertising Simple Mail Transfer Protocol (SMTP) email message that is addressed to the email address of the customer and that includes a plurality of visible SMTP mailto links respectively associated with a plurality of predetermined and mutually different quantities of a specific product, wherein each visible SMTP mailto link includes:
  associated non-visible unique identifying information including an SMTP email address of the e-commerce system and an associated one of the plurality of identifiers; and
  a visible indicia of a predetermined amount of a product corresponding to the identifier related to a specific product;
  wherein each visible SMTP mailto link, upon selection, generates a unique order reply SMTP email message from the email address of the customer that includes only the non-visible unique identifying information from the associated one of the plurality of identifiers;
an email server configured to transmit, by the email server, utilizing SMTP, the advertising email SMTP message to the email address of the customer and to receive a unique order reply SMTP email message, wherein the unique order reply SMTP email message indicates an order by the customer for a specific product in a predetermined and mutually different quantity, wherein the unique order reply SMTP email message is responsive to the advertising SMTP email message, wherein the unique order reply SMTP email message is addressed to the email address of the e-commerce system; and
wherein the at least one processor and the email server are further configured to perform an order execution procedure based on the unique order reply SMTP email message, wherein the order execution procedure includes transmitting, by the email server, one or more payment messages to a payment processing system to purchase the specific product in the predetermined and mutually different quantity for the customer.

19. The e-commerce system of claim 18, wherein:
the database is further configured to store credit card information of the customer;
the one or more payment messages include the credit card information of the customer; and
the payment processing system is a payment gateway that is operated by an acquiring financial institution.

20. The e-commerce system of claim 18, wherein the email server is further configured to perform the order execution procedure by transmitting one or more fulfillment messages to an order fulfillment system.

21. The e-commerce system of claim 18, wherein:
the at least one processor is further configured to determine, in response to the unique order reply SMTP email message, whether an order confirmation procedure should be performed; and
the at least one processor and the email server are further configured to perform the order confirmation procedure in response to a determination that the order confirmation procedure should be performed.

22. The e-commerce system of claim 21, wherein:
the at least one processor is further configured to generate a confirmation SMTP email message, wherein the confirmation SMTP email message includes text that solicits the customer to confirm the unique order reply email message, wherein the confirmation SMTP email message is addressed to the email address of the customer, and wherein the confirmation SMTP email message includes a second mailto link, wherein the second mailto hyperlink includes:
the email address of the e-commerce system; and
an order identifier associated with the unique order reply email message;
the email server is further configured to transmit the confirmation SMTP email message and to receive a confirmation response SMTP email message, wherein the confirmation response SMTP email message is responsive to the confirmation SMTP email message, wherein the confirmation response SMTP email message is addressed to the email address of the e-commerce system, and wherein the confirmation response SMTP email message includes the order identifier and information that indicates whether the order is confirmed or canceled; and
the at least one processor is further configured to determine whether the order execution procedure should be performed based on the information that indicates whether the order is confirmed or canceled.

* * * * *